March 1, 1949.　　　　E. M. BORG　　　　2,462,840
EXTRACTING MACHINE
Filed Sept. 2, 1944　　　　　　　　　5 Sheets-Sheet 3

INVENTOR.
EDWARD M. BORG
BY Cook & Robinson
ATTORNEYS

March 1, 1949. E. M. BORG 2,462,840
EXTRACTING MACHINE
Filed Sept. 2, 1944 5 Sheets-Sheet 5

INVENTOR.
EDWARD M. BORG
BY Cook + Robinson
ATTORNEYS

UNITED STATES PATENT OFFICE 2,462,840

EXTRACTING MACHINE

Edward M. Borg, Seattle, Wash.

Application September 2, 1944, Serial No. 552,401

15 Claims. (Cl. 100—39)

This invention relates to improvements in extracting machines, and more particularly to machines for use in treatment of fish for its preservation and/or canning in accordance with that method disclosed and claimed in my copending United States Patent 2,411,188 issued November 19, 1946, and in which method the extraction of liquid content from the fish meat is most important both for preservation and to insure the palatability of the preserved product.

The method to which reference is above made and for which the present extracting machine is primarily designed for use, applies especially to the preserving or treating of fish of those species commonly referred to as "ground fish" or "bottom fish," or to other species which heretofore for similar reasons have been considered most difficult, if not impractical or impossible, to satisfactorily preserve, either in cold storage or in cans, the reason for this difficulty being that there is a chemical reaction on the meat by the liquid constituent of the meat that causes it to become rancid and mushy almost immediately upon the removal of the fish from the sea water.

In accordance with the teachings of the method of the copending application above referred to, the meat of such fish can be preserved and retained most palatable, either in cold storage or in sealed containers, if that certain detrimental or undesirable liquid constituent be extracted from the fresh meat.

The present invention has had in mind to design a commercially practical, economical and satisfactory device for the forced removal or extraction of that particular liquid constituent of the fish meat that, if not extracted, is detrimental to its preservation and to use of the fish as a food product. However, it is not the intent that the present machine be limited to, or restricted in use to the preservation of fish, but that it shall be used for any purposes to which its particular construction and mode of operation makes it applicable, whether for fish treating or for analogous extractive operations.

In view of the foregoing, it has been the object of this invention to provide a machine that is equipped with means whereby open containers of fish, or the like, may be successively fed thereto and subsequently discharged therefrom, and with novel devices for the application of direct mechanical pressure and centrifugal force to the contents of each container in its passage through the machine, to effect the forcible extraction, or displacement of that undesirable liquid content from the fish, and the filtration of the liquid, as thus extracted, from the containers.

More specifically stated, the invention resides in the provision of novel mechanism for accomplishing a forced or mechanical extraction of liquid content from fish or any product of the character of fish, comprising a spinning pad for the support and high velocity spinning of a container holding the product, and a pressure plunger adapted to be actuated into the container and to apply regulated high pressure against the product therein so that the combined action of centrifugal force and direct mechanical pressure will displace the liquid content from the product to any desired extent as provided for by the controlled application of these forces, and will effect its dissipation from the container to leave the product compact and comparatively dry and in the nature of a steak, and in so doing, eliminate the detrimental effects of the liquid content insofar as palatability and the preservation of the meat is concerned, and produce a more desirable product from the standpoint of appearance and edibility.

It is also an object of this invention to provide a machine of the above character that is designed for the commercial canning or preserving of fish and wherein a plurality of extracting units are arranged on a rotating turret to increase the capacity of the machine and the speed of production.

Another object of the invention is to provide pressure heads of novel kind that will retain the meat and all nutritious solids in the container under the application of direct pressure and centrifugal forces, but will permit the dissipation of the displaced or extracted liquid from the container.

Yet another object of the invention is to provide means in the machine to automatically limit the speed or rate of spinning the containers, together with means for a controlled and yielding application of direct pressure against the product from which the extraction is being made.

Still another object of the invention is to provide a method of treating fish of those kinds heretofore canned, which will improve their flavor, texture and palatability and expedite the canning operation.

Other objects of the invention reside in the details of construction and combination of parts embodied in the present machine, and in its mode of operation, as will hereinafter be fully described.

In accomplishing the above mentioned and other objects of the invention, I have provided the improved details of construction, the preferred forms of which are illustrated in the accompanying drawings, wherein—

Briefly described, the present machine, in a practical commercial embodiment of the invention, comprises a rotating turret, or table, equipped, concentrically of its axis of rotation, with a circular row of can spinning pads. Associated with the turret, and synchronized with its rate of rotation, are devices for successively delivering product filled, open cans or containers onto the spinning pads and for successively removing the containers from the machine after the extractive operation thereon. Carried by the turret, above each spinning pad, is an extractor head that is actuated downwardly into the container by means of a cam follower thereon engaging with a stationary cam rail, and thereby pressing the head against the contents of the container. Below the turret are devices for effecting the high velocity spinning of the pads and containers while the direct mechanical pressure is applied against the container's contents by the extractor heads, thus to quickly and effectively displace the liquid content from the tissues and cells of the meat and effect the dissipation of the extracted liquid from the container. A cam is arranged to control the timed actions of the extractor heads, moving into and from the containers, and another cam times the period of spinning the pads so that there will be no spinning except while the container's contents is held intact by the heads.

It is believed of significance to emphasize at this point that the herein described extraction, or displacement of liquid constituent from the meat is not to be confused with the usual draining of cans to get rid of the free water that is found in fish filled cans and which usually results from the washing of the fish or from the shrinkage of meat in the precooking. The present extraction applies to the forced displacement of that liquid content which is confined in the meat tissues and cells and can only be removed by direct and exceedingly high pressure.

Referring more in detail to the drawings—

Figure 10:
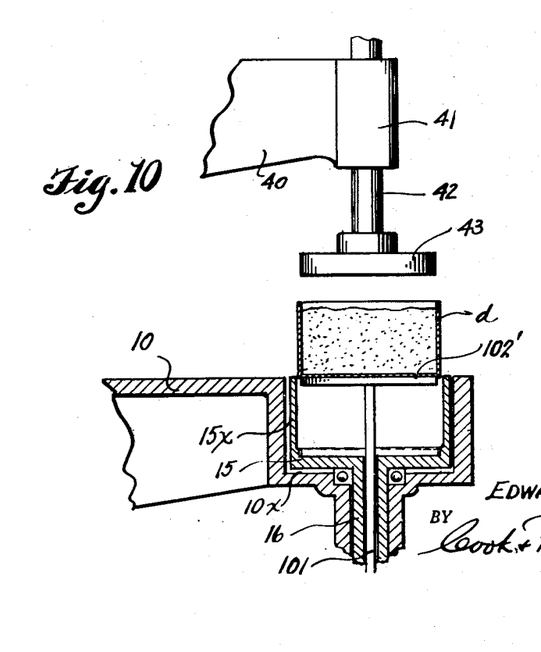
Fig. 10 is a sectional detail of an extraction unit of an alternative form.

The present machine, as disclosed in Figs. 1 to 8, is designed for the treatment of fish in unsealed cans preparatory to the closing and sealing of the cans. The modification of the machine, as seen in Fig. 10, is to be used in a similar treatment of fish where it is intended that it shall be kept in cold storage and subsequently disposed of in individual cartons or in bulk.

The machine as constructed for canning operations, particularly commercial canning, and as disclosed by Figs. 1 to 8 of the drawings, will first be described.

Figure 1:
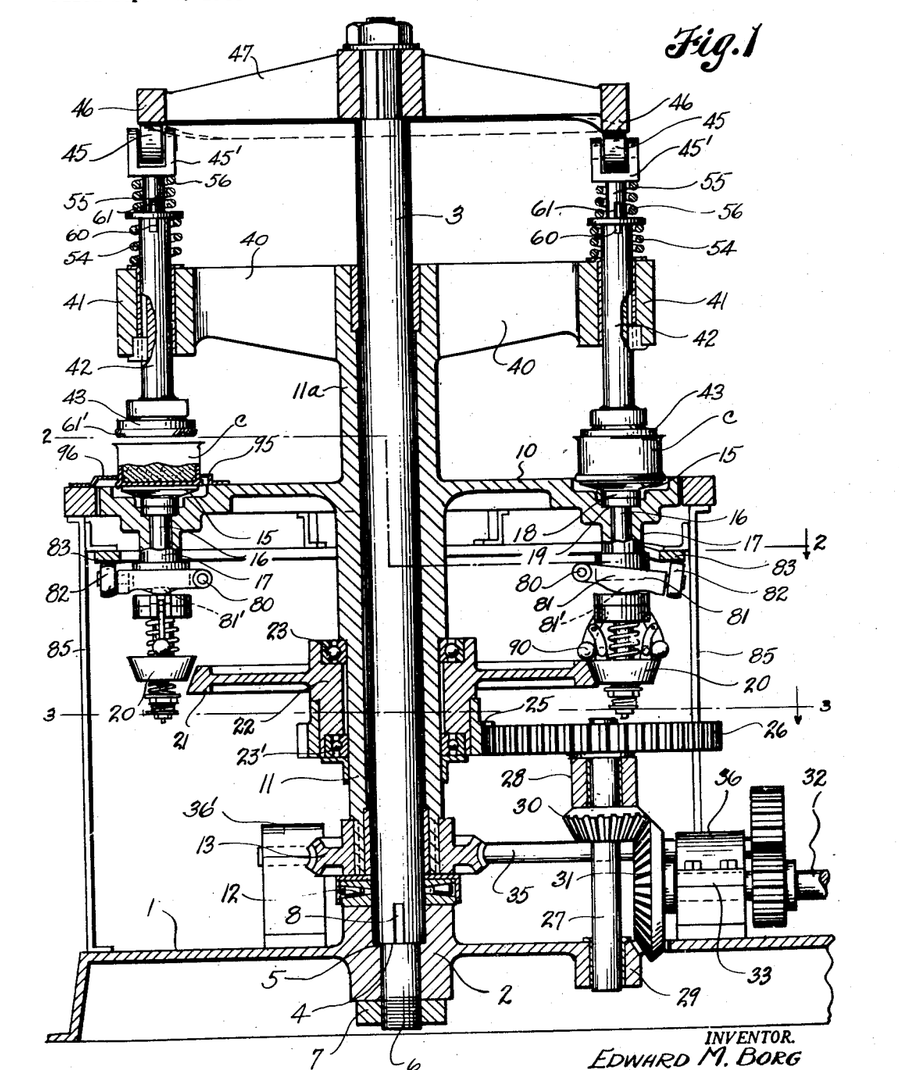
Fig. 1 is a central, vertical section of a machine embodied by this invention, as seen on the line 1—1 in Fig. 2.

In a practical construction, the machine comprises a horizontal base, or bed 1, preferably of such dimensions and construction as to adequately support the machine turret and its driving gearing and motor. The bed is formed with a substantial, vertically directed boss 2 in which the lower end portion of a vertical shaft, or post, 3 is rigidly and solidly secured. Fig. 1 discloses that the post 3 is formed near its lower end with a downwardly facing shoulder 4, engaged against an opposing seat 5 in the boss, and that it terminates in a reduced, threaded portion 6 to which a nut 7 is applied and tightened against the lower end of the boss 2 to hold the post rigid and secure. The lower end portion of the post is keyed in the bearing as at 8, to hold it against possible rotation.

The post 3 extends to a substantial height above the bed plate, and has a horizontal turret, or table 10 mounted thereon for rotation about its medial portion. This turret is circular in form and is equipped with an elongated, tubular hub portion comprising a part 11 integral with the turret top and extended substantially below the turret, and a part 11a likewise extended above the turret top. At its lower end, the hub portion 11 rests upon an anti-friction bearing 12 of suitable character, which bearing, in turn, is seated solidly against the upper end of the boss 2 about the post 3 for the rotary support of the turret. A worm gear wheel 13 is keyed on the lower end of the hub portion 11 and this gear is driven by means presently described for rotating the turret.

Figures 5, 6, 7, 8:
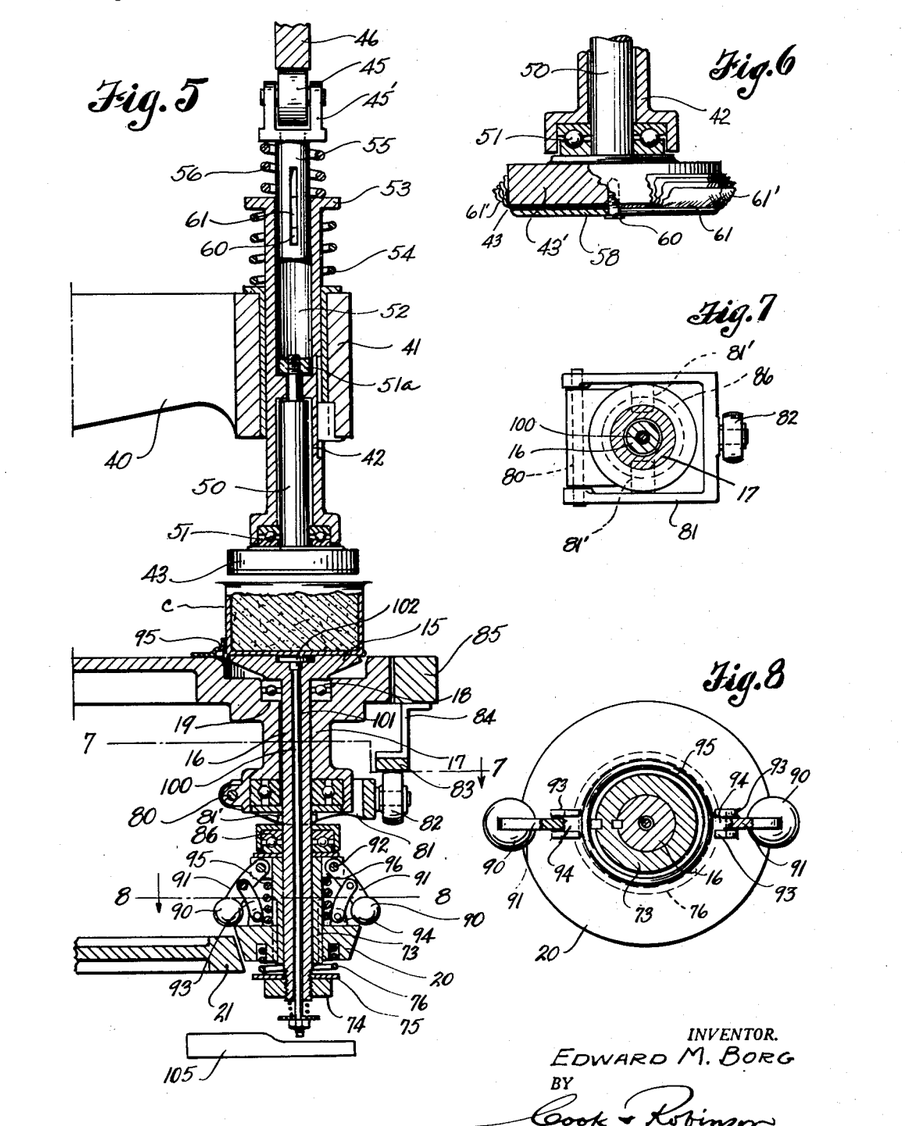
Fig. 5 is an enlarged vertical section taken in the axial plane of one of the can spinning and extraction units.
Fig. 6 is an enlarged cross sectional detail of one of the extractor heads.
Fig. 7 is an enlarged cross section on line 7—7 in Fig. 5.
Fig. 8 is an enlarged cross section on line 8—8 in Fig. 5.

Mounted in the turret top, and concentrically of the axis of rotation, is a circular row of can spinning pads 15, equally spaced apart and each equipped for its support and rotation with an axial stem or shaft 16 revolubly contained in a bearing housing 17 that is integral with and depends downward from the turret as seen best in Fig. 5. In the machine herein illustrated, there are ten such pads, but this number might be increased or decreased as may be required or desired for any particular operation. Each pad, in its intended use, is required, while spinning, to sustain the downward extracting pressure applied to the contents of containers placed thereon, and therefore each pad is supported directly upon a suitable anti-friction bearing 18 applied about the pad stem 16 and retained in a seat 19 in the corresponding bearing housing. As noted in Fig. 5, the top surface of each pad 15 is even with the top surface of the turret in order to afford an easy sliding of cans onto and from the pads by the means herein provided and later described.

In Fig. 5, I have illustrated the position of cans C on the pads during the extraction operation, and it is there to be observed that each can has its bottom wall flat against the top of the supporting pad, and is centered on the pad by reason of the pad fitting snugly within the lower end flange formed by the double seam.

On the lower end of each shaft or stem 16, a driving friction wheel 20, of conically tapered form, is slidably keyed as will presently be explained in detail, and this wheel is adapted to be driven when actuated into engagement with a continuously driven friction wheel 21 that is mounted for rotation about the hub portion 11 of the turret. As noted best in Fig. 1, the wheel 21 has a conically tapered surface, corresponding to but opposite to the slope of the peripheral surface of the wheels 20, and it has a hub portion 22 of substantial length mounted on the hub 11 through the mediacy of upper and lower sets of ball bearings 23—23' for free turning thereon. A gear wheel 25 is fixed on the hub 22 and this is driven by a somewhat larger gear wheel 26 that is fixed on the upper end of a vertical driven shaft 27 that is carried, adjacent the wheel 26, in a bracket bearing 28 that is fixed on the base 1 and, at its lower end, in a base plate bearing 29. Keyed on the shaft 27 is a bevel gear 30 and this is driven by a larger bevel gear 31 fixed on a horizontal shaft 32. Shaft 32 is rotatable in a supporting bearing 33, and is adapted to be power driven by a motor or other suitable power device, not herein shown. Thus through the gears 25, 26, 30 and 31, and the gear mounting shafts 27 and 32, the friction wheel 21 may be driven at high rate and this, through frictional contact with the wheels 20, as presently explained, will drive the can spinning pads 15 at the desired speed.

It will here be mentioned that the gearing herein provided operates to drive the wheel 21 opposite to the direction of rotation of the turret so as to add to the speed of rotation of the pads.

Mounted at one side of the motor driven or main drive shaft 32, is a horizontal countershaft 35 (see Fig. 3), carried in bearings 36 and 36'. On one end of this latter shaft, a worm 37 is keyed. This worm is in driving mesh with the worm gear 13, and operates to rotates the turret. On the other end of shaft 35 is a gear wheel 38 driven by a smaller gear wheel 39 on shaft 32. Thus it is provided that the turret shall be turned at a relatively slow rate that will give the required time interval in the machine operation for the extraction of liquid from the product being treated while the cans are moving between the receiving and discharge stations.

Extended radially from the upper end of the hub portion 11a of the turret are horizontal arms 40, corresponding in number to the spinning pads and each having a bearing 41 at its outer end, vertically alined with the corresponding pad, and on which bearings plungers are reciprocally mounted. Each plunger comprises a tubular mounting stem 42, coaxially alined with the corresponding pad, and reciprocally contained in its bearing 41 for up and down movement, but keyed against rotation therein. At its lower end, each stem mounts a pressure head 43, designed for entering the upper, open end of a container or can C that may be positioned on the corresponding pad and at its upper end each stem mounts a cam follower or roller 45 engaged with a circular cam rail 46 that is integral with a frame 47 fixed solidly and against rotation on the upper end of post 3. The cam rail is so designed that, as a roller 45 moves in rolling contact therealong, the plunger 42 is first actuated downwardly to move the head 43 into the open container, then to move gradually downward for a predetermined interval to exert pressure on the contents of the can, then to move upwardly to withdraw the plunger from the can just prior to its reaching the removal station.

In Fig. 5, I have shown one of the extraction or pressure units in enlarged axial section. It is observed that the pressure head 43 is fixed on the lower end of a spindle shaft 50 that is rotatably held in the lower end portion of the tubular plunger 42. The top side of the head seats against an anti-friction thrust bearing 51 that is contained in the lower end of the plunger to sustain the counter pressure. The shaft 50 is held in place by a nut 51a threaded onto a reduced upper end portion thereof and adapted to engage with the base of an axial bore 52 formed in the plunger from its upper end. About the upper end of the plunger 42 is an annular flange 53. A coiled spring 54 that encircles the upper end portion of the plunger, rests against the upper end of the bearing 41, and exerts upward pressure against this flange to lift the pressure head from the container with the travel of the cam roller along and under control of the cam rail 46.

The cam roller 45 for each pressure unit is mounted at the upper end of a stem 55 that is slidably mounted in the upper end bore 52 of the tubular plunger. A coiled spring 56 encircles the stem and is retained under compression between the upper end of the plunger and the base of a mounting yoke 45' of the roller. A key 60 is fixed diametrically in the plunger and is extended through a longitudinal slot 61 in the stem 55 to limit the outward movement of the latter relative to the plunger under the expansive force of spring 56. The spring 56, however, is substantially stronger than spring 54 and normally retains the stem 55 fully extended and, in effect, rigid relative to the plunger. However, in the event that a can should be filled too full, or for any reason should become jammed and the plunger unable to move down, the spring 56 would yield under the cam pressure and damage would be avoided.

Since it is the function of each pressure unit, through the mediacy of its head 43, to apply pressure downwardly against the contents of a can or container placed on a spinning pad 15, and to retain the solid content of the can while releasing the extracted liquid content, the head 43 is of special construction. Fig. 6 shows a head 43 of suitable kind for most uses. It comprises a circular plug or body 43' somewhat smaller in diameter than the can. To the top of this plug is fixed the lower end of its mounting stem 50. Applied against the under side of the plug and clamped thereto by an overlying metal disk 58 held by a center screw 60, are fabric disks 61, each having a peripheral portion 61' overlapping the cylindrical side surfaces of the plug. Thus, when the plug is moved down into the open end of a can against the can's contents, the edge portions of the fabric disks act to close the space between the can wall and plug. The fabric, being of a porous nature, will operate as a strainer filter that retains the solid matter in the can, but allows the liquid to pass therethrough under the extracting pressure that is applied on the contents by the downward action of the plunger and the centrifugal force of rotation. Modifications of this head have been shown in Figs. 12, 13 and 14, and will later be described.

Figure 2:
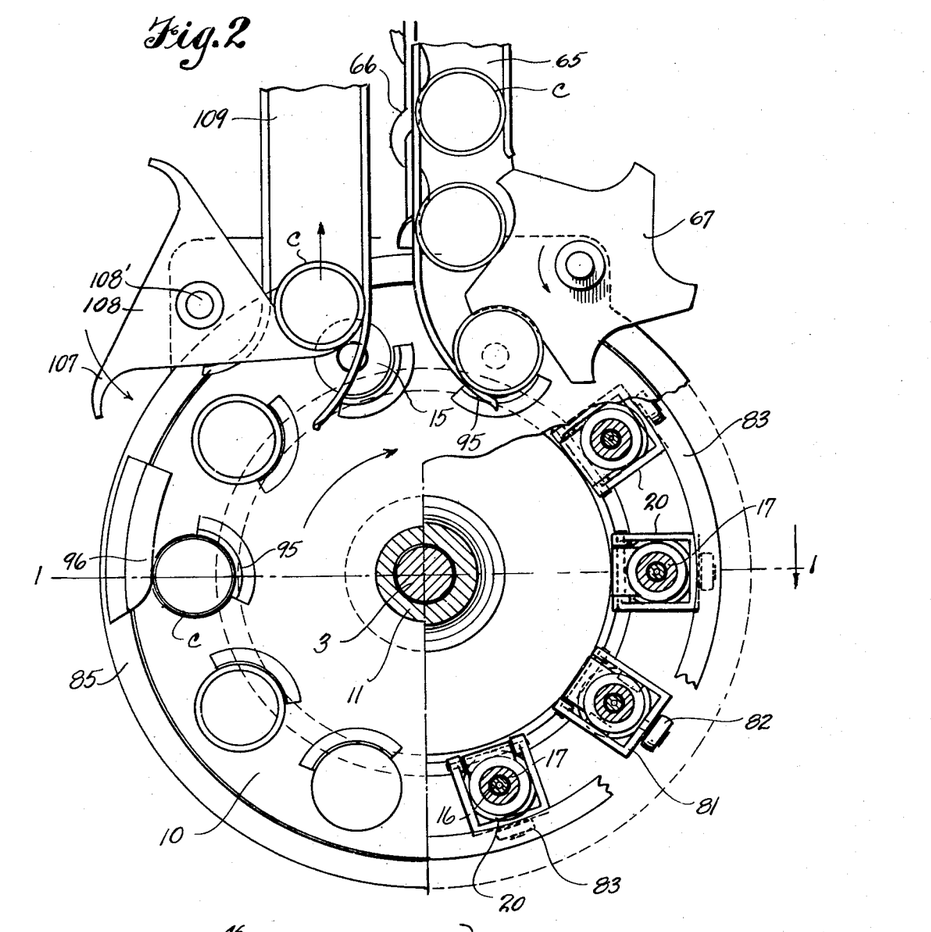
Fig. 2 is a horizontal section, substantially on line 2—2 in Fig. 1, showing the can feed and can removal means, and the circular arrangement of can spinning pads on the turret.
Figure 3:
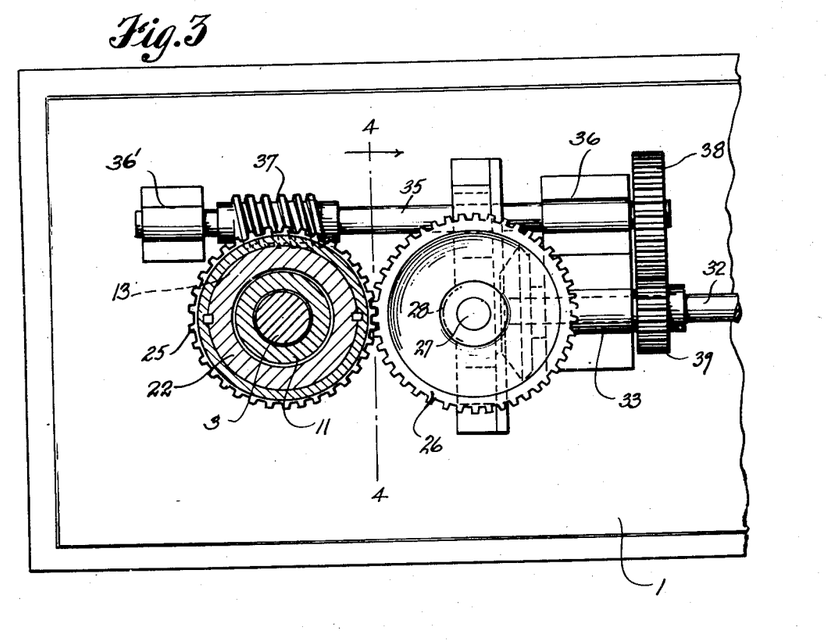
Fig. 3 is a horizontal section on line 3—3 in Fig. 1, showing the arrangement of the turret driving and the friction wheel driving gears.
Figure 4:
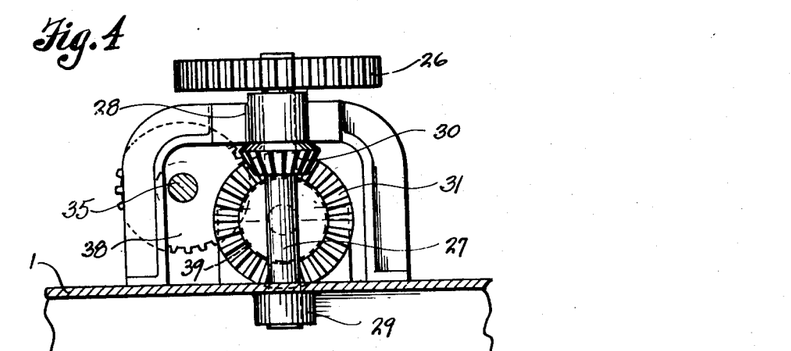
Fig. 4 is a vertical cross section taken on line 4—4 in Fig. 3.

It has been found most desirable that the spinning of the container shall not start until after the pressure head 43 has entered the can end and that it shall cease prior to withdrawing the head. Therefore, it is necessary to synchronize and time the various operations. In Fig. 2, I have shown the cans C as being delivered to the machine along a guideway 65 under control of a feed screw 66, and a star wheel 67 synchronized with rotation of the turret and which places the cans on the pads. Immediately following the positioning of a can or container on a pad, the corresponding plunger 42 is actuated downwardly, to move its pressure head 43 into the can end; then for a continuing interval of travel, the head moves gradually downward, first applying easy pressure, gradually increased, according to the species of fish, and finally a heavy pressure against the contents. In the diagrammatic development of the cams shown in Fig. 11 the incline of the cam 46, indicated at 68, is that for actuating the head 43 into the open end of the can. The long sloping incline 69 is that which effects gradual application of pressure, and the incline 70 is that which at the end of the extraction period, permits lifting of the pressure head clear of the can and to its upper limit of travel.

The spinning of any can mounting pad 15 is effected by bringing the corresponding friction wheel 20 into peripheral contact with the periphery of driven friction wheel 21. The mechanism for this operation is shown best in Fig. 5, wherein it is disclosed that wheel 20 is slidably keyed to a tubular hub 73 which, in turn, is slidably keyed to the pad mounting spindle 16. On the lower end of the spindle 16 is a nut 74 supporting a washer 75 and coiled spring 76. This spring bears against and urges the wheel 20 upwardly, normally retaining it out of frictional contact with wheel 21. Pivoted upon the lower end of the spindle bearing 17, at one side thereof, as at 80, is a frame 81 (see Figs. 5 and 7) which at its end opposite the pivot 80, mounts a cam roller 82 which travels in rolling contact with a circular cam rail 83 that is fixed by means of brackets 84 to a frame or housing member 85 that surrounds the turret, even with its top surface, and is fixedly supported on the base 1. The cam rail 83 is concentric of the axis of rotation of the turret, and is so designed that immediately following the downward movement of a pressure head 43 into a can, the corresponding frame 81 is swung downwardly by its cam roller 82. The opposite side members of the frame 81 have lugs 81' extended therefrom to engage the top raceway of a ball bearing cage 86 that rests on the upper end of the hub 73 about the stem 16, and the downward action of the frame 81 thus moves the wheel 20 downward, compressing the coiled spring 76 and causing the wheel periphery to frictionally engage the driven wheel 21, thus to spin the pad and container mounted thereon, while mechanical pressure is applied against the contents of the can by the pressure head 43.

Figure 11:
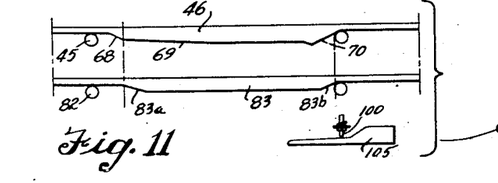
Fig. 11 is a view showing the development of the cams for timed control of the action of pressure heads; for the spinning of the can mounting pads, and for actuation of the ejector pads; diagrammatically showing their operative relationship.

The cam rail 83 is so designed that at a time just prior to the lifting of the pressure head from the can, the wheel 20 is permitted, under force of spring 76, to be disengaged from the wheel 21, so that rotation stops just prior to the uncovering of the can. Fig. 11 shows the development of cam 83, and at 83a shows the incline of the cam that, through the action of frame 81 moves the wheel 20 into contact with wheel 21, and at 83b shows the incline that permits rise of the extractor head from the can. The relationship of the inclined parts 83a and 83b to the inclined parts 68, 69 and 70 of cam 46 is here shown.

It is to be understood that the spring 76 is of such strength that it retains the bearing 86 against the lugs 81' of the frame 81 and holds the frame roller 82 in rolling contact with cam rail 83.

In order that there may be an automatic disengagement of the friction wheel 20 from wheel 21 if the speed of rotation becomes too high, I have provided, for each unit, a ball governor mechanism as shown in Figs. 5 and 8. Ball governor weights 90 are carried by radial arms 91 pivoted at their inner ends, as at 92, to the upper end portion of hub 73. The arms 91 are pivotally connected by links 93 with ears 94 on the wheel 20 and a heavy coiled spring 95 is disposed under compression between the top of the wheel and a shoulder 96 at the upper end of the hub. The spring 95 is of such strength as to normally retain the governor fully contracted but under a predetermined speed of rotation, the centrifugal force imparted to the weights will cause them to compress the spring, thereby to lift the wheel 20 clear of wheel 21, thus to discontinue the driving contact.

It has been found necessary that the cans be held down on the spinning pads 15 when the pressure heads 43 are lifted for withdrawal therefrom. Therefore, I have fixed arcuate flange pieces 95 on the turret at one side of each pad. When the cans are moved onto the pads by the star wheel, they will be disposed with the lower double seam just below the arcuate edge of this flange piece. At the discharge side of the machine (see Figs. 1 and 2), a flange member 96 of limited extent is fixed to the frame and the arcuate edge of this is so located that it will overlie the lower double seam at the opposite side of the can. Thus, when the pressure head 43 is lifted from a can, the flange pieces engage the can seam to keep the can from lifting therewith and the pressure head can be withdrawn. These flanges are so located as not to interfere with the feeding of cans into or from the machine, or with the spinning of the cans.

The means for removal of cans from the turret is shown in Figs. 2 and 5. After a can has passed beyond the flange member 96, the can is slightly lifted from its pad by a lift rod 100 to free it therefrom. The rod extends within a continuous central bore 101 in the pad 15 and its stem 16. At the upper end of the rod is a small pad or head 102 normally disposed within a shallow recess in the pad. The lower end of the rod projects below the lower end of the stem and is so disposed that in the rotation of the turret, it will engage with a stationary cam rail 105 that moves the rod upwardly, thus to cause the head 102 to unseat the can from the pad. At the time of its release, the can is engaged by one of the arms 107 of a star wheel 108 on a rotatably driven shaft 108'. The wheel is driven at such speed as to cause the arm to engage and shift the can outwardly, clear of oncoming cans, and into a discharge guideway 109 along which it will pass from the machine.

So far, this specification has dealt with the treating of fish in tin cans preparatory to hermetically sealing the can. However, it is contemplated that in lieu of the hermetic sealing, the fish might be given an extractive treatment and then retained in cold storage and later distributed in bulk or in packages. For this method of preservation, it is practical to place the meat in paper cartons or containers. However, the use of paper in lieu of tin containers, calls for a modification of the extractor mechanism, particularly in the provision of spinning pads designed to receive the paper cartons and to support them so that they will withstand the extractive pressure. In Fig. 10, I have shown a modified structure for this purpose; it being understood that, in such a machine, the turret 10 and its driving means remain as has already been described, but the spinning pads as here used are set down within recesses 10x in the turret and each is formed with a metallic cylindrical flange 15x of a diameter to snugly receive cup-like paper containers d, here used in lieu of tin cans, and are of the same height as the containers. The feed devices for delivery of the containers to the machine may be like those previously described, as are also the removal devices. The knock-out pads 102' associated with the pads 15 are of an increased diameter nearly equal to the diameter of the pads and their vertical travel is so increased by design of the cam 105 that when they are moved upwardly to their upper limits by the action of the cam, they will be flush with the top edge of the flange 15x, and when lowered, will seat within the pad 15, as indicated in dotted lines in Fig. 10.

In operation of this modified mechanism, each pad 102' is actuated to its upper position for the removal of the container after treatment of its contents, and it remains in the lifted position until removal of the treated containers and the placement thereon of the next container for treatment. When the next container is in place thereon, the corresponding pressure head 43 is lowered thereinto and as it enters the open end of the container, the supporting pad 102' then moves downward therewith and the carton is lowered into the cylindrical flange on the spinning pad. This flange then serves to sustain the centrifugal force and the expanding pressure to which the carton is subjected during the further downward travel of head 43 for the extracting operation.

After an extracting operation, head 43 is lifted, the pad 102' moved upward to level with the top of the pad flange, and the treated container is removed by the means already described.

Figure 9:
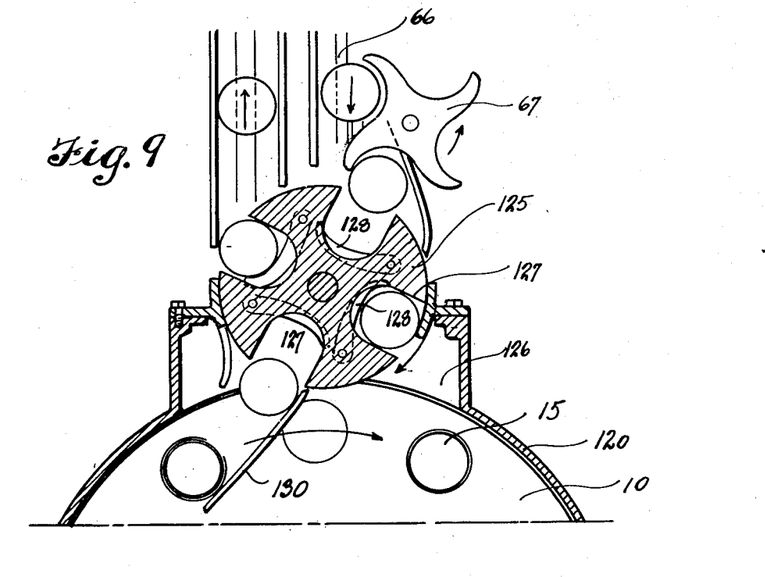
Fig. 9 is a horizontal section of part of a machine employing vacuum for aiding extraction under pressure, particularly illustrating the intake and discharge valve of the vacuum chamber.

It has been found expeditious for treatment of some fish, to carry on the extraction of liquid content under vacuum. When this is desired, the mechanisms already described may be located within a vacuum chamber such as that designated at 120 in Fig. 9. Where extraction is carried on in a vacuum chamber, it is required that the cans or containers be brought into and removed from the chamber by a suitable valve mechanism which will retain the vacuum in the chamber. Therefore, in Fig. 9 it is shown that a rotary valve device 125 is set within an opening 126 in the chamber wall. The valve is rotated by suitable means in timing with the turret rotation, and it is formed with a plurality of pockets 127 into which the cans are received from the feed conveyor 66 and star wheel 67 and are carried into the chamber, there to be placed on the turret pads by the timed actuation of the rotating valve. This treated cans later are moved from the pads, back into pockets of the valve upon contact with the guide strip 130. The valve mechanism shown in Fig. 9 may be like or similar to that shown in U. S. Letters Patent No. 1,758,369, and it might be modified as required for the handling of cans of any special size or shape.

The application of direct downward pressure against the meat by the extractor head 43, in addition to the liquid displacing effect, has the additional result of overcoming the formation of a hollow center or the cupping of the meat in the container that would result from the centrifugal force if such direct pressure were not applied. The direct pressure by head 43 is quite high and by the special design of cam 46 is so applied as to leave the meat in steak form upon completion of the extracting operation.

Such machines may be made in various numbers of units, in various sizes and various changes made to meet any special requirement for any specific product.

Having thus described my invention, what I claim as new therein and desire to secure by Letters Patent is:

1. In an extracting machine of the character described, a pad for mounting an open, fish filled container thereon, a pressure head associated with the pad, means for moving the pressure head into the open end of a container mounted on the pad and against its contained fish for the forcible displacement of liquid content therefrom, and means for spinning the pad and container, while such pressure is being applied by the head, to effect the centrifugal extraction of liquid from the fish and its dissipation from the open end of the container.

2. An extracting machine of the character described comprising a support, a can spinning pad axially revoluble in the support and adapted for the mounting of an open, fish filled container thereon, a pressure head supported above the pad and rotatable coaxially thereof, means for actuating the pressure head from withdrawn position into the open end of a container placed on the pad and against its contents for displacing liquid content therefrom, and means for spinning the pad and container while its contents is under pressure for the centrifugal extraction of the displaced liquid content and its dissipation from the open end of the container.

3. An extracting machine as recited in claim 1 wherein the pressure head fits within the can end to retain the solid content under the direct and centrifugal forces applied, and embodies a liquid filtering portion for the passage therethrough of the displaced liquid content.

4. An extracting machine of the character described comprising a support, a pad revolubly mounted in the support for the mounting of an open, fish filled container thereon, a pressure head disposed above the pad, means for moving the head from a raised position, downwardly within the open end of a pad mounted container, and against its contents to effect forcible displacement of liquid content therefrom, and means for spinning the pad and container to effect the centrifugal extraction of liquid content from the fish; said pressure head comprising a liquid filtering gasket about its periphery closing the container and providing for the dissipation of extracted liquid therefrom while retaining the solid content in the container.

5. In an extracting machine of the character described, an axially revoluble support for mounting an open, fish filled container, an axially revoluble pressure head mounted above the support, means for actuating the pressure head from a raised position, downwardly into the open end of the mounted container and against the contained fish to effect the forced displacement of liquid content therefrom; and means for spinning the support and a container mounted thereon to effect the centrifugal extraction of displaced liquid content from the fish and its dissipation from the open end of the container; said head having a liquid filtering gasket applied to its under surface and about its periphery in closing contact with the container walls to retain solid content while permitting dissipation of the extracted liquid therethrough and from the container.

6. A machine of the character described comprising a rotatably mounted turret, a plurality of can spinning pads mounted thereon, means for placing open, fish filled cans on the pads, pressure heads mounted by the turret above the pads, means for actuating the heads to move them into the open ends of the containers as placed on the pads to compress the fish and effect displacement of its liquid content, and means for spinning the pads and the containers placed thereon to effect the centrifugal extraction of liquid content from the fish and cause its dissipation from the open end of the containers past the pressure heads.

7. A machine of the character described comprising a horizontal turret, a plurality of pads circularly arranged concentrically thereon, means for rotating the turret, means timed with rotation of the turret for placing open, fish filled containers on the pads as they successively pass a receiving station, pressure heads mounted on the turret, above the pads, means for causing the pressure heads to move into the placed containers against the fish therein to effect the forcible displacement of liquid content therefrom, and means for spinning the pads and containers for the centrifugal extraction of displaced liquid content and its dissipation from the container past the pressure head.

8. A machine of the character described comprising a horizontal turret, a plurality of pads circularly arranged concentrically thereon, means for rotating the turret, means timed with rotation of the turret for placing open, fish filled containers on the pads as they successively pass a receiving station, pressure heads mounted on the turret, above the pads, means for causing the pressure heads to move into the placed containers against the fish therein to effect the forcible displacement of liquid content therefrom, means for spinning the pads and containers for the centrifugal extraction of displaced liquid content and its dissipation from the container past the pressure head, means for lifting the pressure heads from the containers at the end of the extracting operation, and means for the removal of the containers from the turret.

9. A machine of the character described comprising a revolubly mounted turret, a plurality of container spinning pads mounted thereon, means for rotating the turret to move the pads successively past a receiving station and a discharge station, means for placing an open, fish filled container on one each of the pads as they pass the receiving station, means for removing the containers from the pads as they pass the discharge station, pressure heads mounted on the turret above and alined with the pads, means for moving the heads into the containers as placed on the corresponding pads and to cause liquid content displacing pressure to be applied thereby against the contained fish, and means for causing the spinning of the pads during the period of the application of pressure to effect centrifugal extraction of the liquid and its dissipation from the open ends of containers.

10. In a machine of the character described, a support, a can spinning pad having a mounting spindle revoluble in the support, a continuously driven friction wheel, a driving friction wheel slidably keyed on the pad mounting spindle, yielding means on the spindle normally holding the spindle friction wheel disengaged from the driving friction wheel, and means for moving the driving friction wheel along the pad mounting spindle into frictional driving contact with the continuously driven friction wheel, to cause spinning of the pad.

11. A machine as in claim 10 wherein a ball governor mechanism is mounted on the pad mounting spindle and revolves therewith and is operable to disengage the driving friction wheel from the driven friction wheel at a predetermined rate of rotation.

12. A machine of the character described comprising a base, a center shaft fixed vertically thereon, a turret mounted for rotation on said shaft, a plurality of can spinning pads circularly arranged on the turret, means for rotating the turret, means synchronized with the turret movement for placing open, fish-filled containers on the pads as they successively pass a receiving station, pressure heads mounted on the turret, above and alined with the pads, each head having a mounting shaft longitudinally movable in its support and formed at its upper end with a cam follower, a cam fixedly supported by the center shaft and with which each of said cam followers engages and said cam being designed to move the pressure heads into the containers as placed on the pads to effect the forcible displacement of liquid content from the fish therein, and means for spinning the pads and containers while the contained fish is under pressure to effect the centrifugal extraction of the liquid content that is displaced by the head pressure.

13. A machine of the character described comprising a base, a center shaft fixed vertically thereon, a turret mounted for rotation on said shaft, a plurality of can spinning pads circularly arranged on the turret, each pad having a mounting spindle, means for rotating the turret, means synchronized with the turret movement for placing open, fish filled cans on the pads as they successively pass a receiving station, pressure heads mounted on the turret above and alined with the pads; each having a mounting spindle extending upwardly therefrom and equipped at its upper end with a cam follower, yieldable means for lifting the heads to raised positions above the pads, a circular cam rail mounted by the center shaft, above the pressure heads and engaged by said cam followers as the turret rotates; said cam being designed to cause the heads to be moved into the cans as they are placed on the pads to compress their contents for the displacement of liquid content therefrom, a continuously driven friction wheel, revoluble about the center shaft, a friction wheel keyed on the spindle of each pad, and means for moving the friction wheels of the pads into driving contact with the continuously driven friction wheel for spinning the pads and cans to effect centrifugal extraction of liquid from the compressed fish, and its dissipation from the cans.

14. In a machine of the character described, a center shaft, a turret supported to revolve about the center shaft, a plurality of can spinning pads circularly arranged on the turret, each having a mounting spindle, means for rotating the turret about the shaft, a friction wheel revoluble about the center shaft, means for continuously driving the said friction wheel; each of said pad spindles having a friction wheel slidably keyed thereon and adapted to be engaged with the continuously driven friction wheel to spin the pad, yielding means on each pad spindle to hold its friction wheel disengaged from the continuously driven friction wheel, a cam rail encircling the center shaft, and levers pivoted on the turret corresponding to each friction wheel and having cam followers engaging said cam rail; said rail being designed to actuate said levers to move the friction wheels into driving contact with the continuously driven friction wheel to spin the pads for centrifugal extraction of liquid content from the fish while under pressure of the heads.

15. An extracting machine of the character described comprising a support for an open, product-filled container, a pressure head associated with the support, means for axially spinning the support and head, and means for moving the pressure head into the open end of a container on said support, against the product therein for the forcible extraction of liquid from the product, and its displacement from the container.

EDWARD M. BORG.

REFERENCES CITED

The following references are of record in the file of this patent:

UNITED STATES PATENTS

| Number | Name | Date |
|---|---|---|
| 236,484 | Brooks | Jan. 11, 1881 |
| 242,554 | Neahous | June 7, 1881 |
| 338,034 | Cartier | Mar. 16, 1886 |
| 1,039,444 | Riemann | Sept. 24, 1912 |
| 1,047,093 | Lemmon et al. | Dec. 10, 1912 |
| 1,153,768 | Darling | Sept. 14, 1915 |
| 1,760,205 | Muller | May 27, 1930 |
| 2,386,532 | Wolcott | Oct. 9, 1945 |